US009879985B2

(12) United States Patent
Basevi et al.

(10) Patent No.: US 9,879,985 B2
(45) Date of Patent: Jan. 30, 2018

(54) SIMULTANEOUS MULTIPLE VIEW SURFACE GEOMETRY ACQUISITION USING STRUCTURED LIGHT AND MIRRORS

(71) Applicant: The University of Birmingham, Birmingham (GB)

(72) Inventors: Hector Richard Abraham Basevi, Birmingham (GB); James Andrew Guggenheim, London (GB); Hamid Dehghani, Birmingham (GB); Iain Bruce Styles, Birmingham (GB)

(73) Assignee: The University of Birmingham Edgbaston, Edgbaston (GB)

( * ) Notice: Subject to any disclaimer, the term of this patent is extended or adjusted under 35 U.S.C. 154(b) by 243 days.

(21) Appl. No.: 14/651,206

(22) PCT Filed: Dec. 9, 2013

(86) PCT No.: PCT/GB2013/053236
§ 371 (c)(1),
(2) Date: Jun. 10, 2015

(87) PCT Pub. No.: WO2014/091214
PCT Pub. Date: Jun. 19, 2014

(65) Prior Publication Data
US 2015/0330775 A1 Nov. 19, 2015

(30) Foreign Application Priority Data
Dec. 12, 2012 (GB) .................................... 1222361.6

(51) Int. Cl.
*H04N 7/18* (2006.01)
*G01B 11/25* (2006.01)
*G06T 7/521* (2017.01)

(52) U.S. Cl.
CPC ............ *G01B 11/254* (2013.01); *G06T 7/521* (2017.01)

(58) Field of Classification Search
CPC .................................................. G01B 11/254
See application file for complete search history.

(56) References Cited

U.S. PATENT DOCUMENTS

| 8,224,064 B1 * | 7/2012 | Hassebrook | ....... G01B 11/2513 |
| | | | 345/585 |
| 2010/0158322 A1 * | 6/2010 | Weston | ................ G01B 11/007 |
| | | | 382/113 |

(Continued)

FOREIGN PATENT DOCUMENTS

WO     WO 2007/050776     5/2007

OTHER PUBLICATIONS

Lanman, et al. Surround Structured Lighting for Full Object Scanning, 3DIM '07, Sixth International Conference on 3-D Digital Imaging and Modeling, IEEE, Aug. 1, 2007, pp. 107-116, XP031130986, ISBN: 978-0/7695-2939-4.

(Continued)

*Primary Examiner* — Tracy Y Li
(74) *Attorney, Agent, or Firm* — Foley & Lardner LLP

(57) ABSTRACT

A method of generating surface geometry information of an object within an imaged region using an imaging system comprising a camera and a source of structured light, the source of structured light comprising a source of a plurality of rays of light. The method comprising obtaining first image data comprising a plurality of pixels, the first image data comprising image data representing the object and first structured light incident on the object, the first structured light comprising a periodic pattern comprising a plurality of pattern elements and having a first spatial frequency projected from said source of structured light and obtaining second image data comprising a plurality of pixels, the second image data comprising image data representing the object and providing information associating each of the plurality of image pixels of the second image data with a ray of said source of structured light. The first image data is processed based upon the second image data to determine a relationship between each of the plurality of image pixels of the first image data and a pattern element of said pattern of (Continued)

the first structured light projected from said source of structured light and the surface geometry information of the object is generated based upon the determined relationship and position data indicating relative spatial positions of said camera and said source of structured light.

19 Claims, 11 Drawing Sheets

(56) References Cited

U.S. PATENT DOCUMENTS

| | | | |
|---|---|---|---|
| 2011/0080471 A1 | 4/2011 | Song | |
| 2013/0218024 A1* | 8/2013 | Boctor | A61B 34/20 600/476 |
| 2014/0152769 A1* | 6/2014 | Atwell | H04N 13/0207 348/46 |
| 2014/0368939 A1* | 12/2014 | Andreasen | G02B 26/0841 359/847 |

OTHER PUBLICATIONS

Epstein, et al. Exploiting Mirrors in Interactive Reconstruction with Structured Light, Proceedings of Vision, Modeling, and Visualization, Dec. 16, 2004, pp. 1-8, Retrieved from the Internet: URL: http://www.ligum.umontreal.ca/Epstein-2004-EMIRSL/mirrors.pdf [retrieved on Feb. 12, 2014].

Geng, Jason. Structured-light 3D surface imaging: a tutorial, Advances in Optics and Photonics, vol. 3, No. 2, Mar. 31, 2011.

Gorthi, et al. Fringe Projection Techniques: Whither we are?, Optics and Lasers in Engineering, vol. 48, No. 2, Elsevier, pp. 133-140, Feb. 1, 2010.

International Search Report issued in PCT Application No. PCT/GB2013/053236 dated Feb. 27, 2014.

Chinese Office Action for 201380072838.5 dated Feb. 3, 2017, (received Apr. 13, 2017).

* cited by examiner

SIMULTANEOUS MULTIPLE VIEW SURFACE GEOMETRY ACQUISITION USING STRUCTURED LIGHT AND MIRRORS

CROSS-REFERENCE TO RELATED PATENT APPLICATIONS

The present application is a § 371 U.S. National Stage Application of International Application No.: PCT/GB2013/053236, entitled "SURFACE GEOMETRY IMAGING," filed Dec. 9, 2013, which, in turn, claims priority to United Kingdom Application Serial No. GB 1222361.6 entitled "SURFACE GEOMETRY IMAGING," filed Dec. 12, 2012. The entire contents of the foregoing applications are incorporated by reference herein.

According to the invention there is provided a method of generating surface geometry information of an object.

Knowledge of surface geometry of an object is desirable in a number of different applications. For example, knowledge of surface geometry can be used to create a copy of an object, for example using a three-dimensional printer. Additionally optical imaging modalities such as Bioluminescence Tomography (BLT) and Diffuse Optical Tomography (DOT) use visible light to determine properties of living tissue allowing the imaging of structural and functional features such as tissue composition and blood oxygenation respectively and such optical imaging modalities require knowledge of surface geometry of a subject in order to model the interaction of light with the subject.

Surface geometry of a subject can be determined using secondary medical imaging modalities such as Computed Tomography (CT) or Magnetic Resonance Imaging (MRI) however such secondary medical imaging modalities require expensive equipment and access to such modalities is generally restricted due to cost.

Various other surface geometry capture methods have been proposed. For example Scanning Light Detection and Ranging (LIDAR) systems measure the time taken for light to travel from an object being measured to a detector and converting the time taken into a distance. However such systems require moving parts to enable the light source to scan over the object and generally have poor accuracy when measuring objects positioned relatively short distances away due to the difficulty in accurately measuring time of flight of light over small distances.

Other techniques such as photogrammetry require multiple images captured from different view points such that triangulation can be performed based upon the images and knowledge of the view point from which each image was captured. Such methods are limited by the requirement of movement of the imaging device or the use of multiple imaging devices.

Fringe projection profilometry uses standard equipment, in particular a camera and a source of structured light that can be projected on to an object to generate surface geometry of the object. When the source of structured light is imaged from a different location the structured light appears deformed by the surface of the object. Deformation of the structured light can be analysed to extract spatial coordinates. As such, fringe projection profilometry provides an imaging technique that can be carried out cheaply without specialist equipment.

Such methods typically use Fourier Filtering and Phasor-based techniques to extract phase information from image data acquired with structured light incident upon an object. Due to the periodic nature of the structured light projected onto the object, such techniques are unable to uniquely extract phase information and the phase information must be "unwrapped" to remove phase wrapping events in which a phase value is incorrectly assigned.

Phase wrapping events can often be determined by identifying pixel value changes from a value close to $\pi$ to $-\pi$ or vice versa in adjacent pixels. Once such phase wrapping events are identified a reference pixel may be selected for which it is assumed that no phase wrapping has occurred and offsets can be added to pixel values to correct for lost multiples of $2\pi$ caused by the phase wrapping. The correction uses unwrapped pixel values to unwrap phases of adjacent pixel values in an iterative manner. However such methods are problematic due to the difficulties of distinguishing phase wrapping events from legitimate large changes in phase, which is further complicated by the presence of instrument measurement noise. Further, properties of the object may result in a change in phase between adjacent values that cannot be distinguished from phase wrapping events. Due to the iterative nature of the unwrapping process any errors that may occur are propagated through the image causing further errors in the output data.

Further, because of the problems associated with processing data generated using fringe projection profilometry imaging equipment arrangement is typically restricted. Such imaging equipment arrangement restrictions provide various limitations on the image data that can be obtained.

Accordingly it is desirable to determine improved imaging methods for generating surface geometry data using standard equipment, for example as used in fringe projection profilometry.

According to a first aspect of the invention there is provided a method of generating surface geometry information of an object within an imaged region using an imaging system comprising a camera, and a source of structured light comprising a source of a plurality of rays of light. The method comprises: obtaining first image data comprising a plurality of pixels, the first image data comprising image data representing the object and first structured light incident on the object, the first structured light comprising a periodic pattern comprising a plurality of pattern elements and having a first spatial frequency projected from said source of structured light; obtaining second image data comprising a plurality of pixels, the second image data comprising image data representing the object and providing information associating each of the plurality of pixels of the second image data with a ray of the source of structured light; processing the first image data based upon the second image data to determine a relationship between each of the plurality of pixels of the first image data and a pattern element of the first structured light projected from the source of structured light; and generating the surface geometry information of said object based upon the determined relationship and position data indicating relative spatial positions of said camera and said source of structured light.

The first image data representing an object and first structured light incident on an object obtained as set out above contains information useful in determining the shape of the object, however some of the information contains ambiguities. By processing the first image data based upon second image data that provides information associating image pixels with rays generated by a source of the structured light incident on the object the ambiguities in the information can be resolved in a manner that provides accurate information. The inventors have realised that processing the data generated by processing the first image data in this way based upon position data indicating relative spatial positions of the components of the imaging system allows surface geometry information of the object to be generated without restrictions on the positions of the components being required, unlike in prior art imaging systems. The method allows commodity products that are readily available at relatively low cost to be used to generate high quality three-dimensional surface information in a fully flexible system component arrangement.

The imaging system may further comprise at least one reflective surface located within the imaged region, wherein each of the image data further comprises image data representing the object reflected from said at least one reflective surface. The reflective surfaces may be generally planar reflective surfaces.

Unlike prior art methods, the invention allows arbitrary arrangement of the components of the system. For example, some prior art methods of generating surface geometry require that the components are arranged in a cross axis configuration within which the camera and projector pupils lie in a plane parallel to a platform on which an object to be imaged is placed. In such prior art methods inclusion of reflective surfaces is problematic because the reflected image data and virtual camera location does not satisfy the cross axis configuration and invalidates assumptions that are required in order to be able to process the image data.

In particular, the inventors have realised that due to the improved flexibility of system component arrangement allowed by the combination of the way in which the relationship between image pixels of the first image data and pattern elements of the pattern of the structured light is generated and the way in which the relationship is processed to generate the surface geometry information, reflective surfaces can be placed within the imaged region to increase or maximise a field of view of said object. Prior art techniques have not heretofore provided the necessary system flexibility that allows image data reflected from reflective surfaces within the imaged region to be modelled effectively.

Generating the surface geometry information of said object may comprise combining the image data representing the object reflected from said at least one reflective surface and image data representing the object that is directly imaged. The combining may comprise generating position data indicating a virtual camera location associated with each of said at least one reflective surface and combining the image data based upon the position data indicating virtual camera locations and the position data indicating relative spatial positions of said camera and said source of structured light. The method may further comprise generating the position data.

Generating the surface geometry information of the object based upon the determined relationship and position data indicating relative spatial positions of the camera and the source of structured light is generally based upon a geometric model of the system that is general. In a general geometric method surface geometry information is generated based upon a geometric model in which relative locations of the components of the system are modelled and the model and the unwrapped phase are used in the generation of the surface geometry information. In particular, a general geometric model may model the projected pattern as a continuous field in space projected from a pupil associated with the projector and the camera as a pupil with rays emanating from the camera pupil resulting in imaged pixels.

The first pattern comprising a plurality of pattern elements may be a sinusoidal pattern. The first image data may comprise image data representing the object and first structured light incident on the object at a plurality of offsets or phases. For example, the first image data may be generated by combining a plurality of images of the object in which the first structured light in incident on the object at respective offsets.

The second image data may be generated based upon third image data comprising image data representing the object and second structured light incident on the object.

The second structured light may comprise a pattern comprising a second plurality of pattern elements and having a second spatial frequency projected from said source of structured light and the first spatial frequency may be greater than the second spatial frequency. That is, the second image data comprising image data representing the object and providing information associating each image pixel with a pixel of the source of structured light may be obtained by imaging the object with structured light incident on the object in a similar manner to the first image data, however at a lower spatial frequency such that the number of repeats of the pattern is fewer in the third image data than in the first image.

For example, the second spatial period may be selected such that the pattern has less than or equal to one period in the imaged region. The second image data may therefore provide image data in which there is little or no ambiguity of the relationship between a ray of the source of structured light and a pixel of the image data. Although such image data provides low quality image data, the inventors have realised that such image data can be used to resolve ambiguity in image data generated using a periodic pattern having a higher period that provides higher quality image data.

The first and/or second image data may be generated by combining image data obtained at each of a plurality of offsets, for example phase offsets.

The pattern may for example be periodic pattern such as a sinusoidal pattern and the ambiguities may be caused by phase wrapping in the image data that causes the phase of a pixel in the image data to be wrapped mod $2\pi$ such that it lies within the interval $(-\pi, +\pi)$. The first pattern and second pattern may be the same pattern with different frequencies or alternatively may be different patterns.

The second image data may be periodic data for the third image data generated based upon the third image data and further image data comprising image data representing the object and further structured light incident on the object at a plurality of offsets, the further structured light comprising a pattern having a further spatial period projected from said source of structured light, and the second spatial period may be greater than the further spatial period.

The second image data may be image data that is generated by resolving ambiguities in the image data based upon further image data obtained using a pattern having a further spatial frequency that is lower than the second spatial frequency. That is, the second image data that is used to process the first image data may itself have been generated by processing further image data in a corresponding manner.

The further image data may also have been generated in a corresponding manner such that the method provides iterative processing of image data in which image data obtained using a pattern at a lowest spatial frequency, for example a spatial frequency less than or equal to 1, is used to resolve ambiguities in image data obtained based upon a next lowest spatial frequency which is then used to resolve ambiguities in image data obtained based upon a subsequent lowest spatial frequency until image data obtained based upon a predetermined highest spatial frequency is processed to resolve ambiguities in the image data.

Processing the first image data based upon the second image data to determine a relationship between each image pixel of the first image data and the first structured light projected from said source of structured light may be based upon the first spatial frequency and a spatial frequency associated with the second image data.

For example, the relationship between each image pixel of the image data and the structured light projected from the source of structured light may be based upon a phase of a sinusoidal pattern projected from the source of structured light and for first spatial period $f_n = y$ and second spatial period $f_{n+1} = z$ of the sinusoidal pattern, values in the second image data $\psi(x, f_{n+1})$ may be determined based upon the values in the first image data $\psi(\underline{x}, f_n)$ based upon the relationship $\psi(x, f_{n+1}) = (z/y)\psi(\underline{x}, f_n)$.

As noted above, the or each pattern may comprise at least one sinusoidal pattern. The frequency may be a spatial frequency of the sinusoidal pattern and the offset may be a phase of the sinusoidal pattern.

The first image data may comprise phase wrapped image data as described above. In particular, pixel values of the first image data may comprise values of the phase of the sinusoidal pattern incident on the object modulo $2\pi$ such that the actual value of the phase of the sinusoidal pattern is unknown. The phase wrapped image data may be generated by combining a plurality of image data, each image data comprising image data representing the object and first structured light incident on the object at a respective one of the plurality of offsets.

The second image data may comprise phase unwrapped image data and processing the first image data based upon the second image data may comprise unwrapping the phase of the first image data based upon the phase unwrapped image data. Phase unwrapped image data is generally image data that encodes the phase structure of the first image data, that is, information that is sufficient to unwrap phase of the first image data and generally provides a correspondence between pixels of the first image data and pixels of the pattern projected on to the image region from the light source.

The phase unwrapped image data may be generated based upon image data obtained of the object and structured light incident upon the object, the light incident upon the object being a sinusoidal pattern having a spatial frequency that is such that the sinusoidal pattern repeats less than or equal to one time in the imaged region. Alternatively the phase unwrapped image data may be generated iteratively based upon image data obtained based upon structured light incident upon the object being caused by the projection of sinusoidal patterns having increasingly high spatial frequencies.

Alternatively, the pattern used to generate the second image data may be a pattern that provides a binary encoding of image elements. For example, the pattern may be based upon a binary pattern comprising black and white stripes (i.e. stripes in which no light is projected and stripes in which bright light is projected). The second image data may for example be generated by projecting a plurality of binary patterns into the imaged region which, when image data generated based upon the plurality of binary patterns is combined, provides a binary encoding of the imaged region that allows a stripe such as a vertical stripe of the imaged region to be uniquely associated with a plurality of rays of light of the source of structured light. The binary encoding may for example be based upon an inverse Gray coding in which adjacent stripes have binary encodings that differ in all but one of the values of the encoding.

The first image data may be generated by projecting the first structured light onto the object at a first plurality of offsets that is greater than a plurality of offsets associated with the second image data. In particular, the image data that is used to generate the surface geometry information of the object may by generated based upon a greater number of offsets of the pattern onto the object than other image data used in the method in order to provide a higher frequency for the final image data.

The first aspect of the invention may therefore provide a method of generating surface geometry information of an object within an imaged region using an imaging system comprising a camera and a source of structured light comprising a source of a plurality of rays of light, the method comprising obtaining first image data, the first image data comprising image data representing the object and first structured light incident on the object at a plurality of offsets, the first structured light comprising a sinusoidal pattern having a first spatial frequency projected from said source of structured light; obtaining second image data comprising a plurality of pixels, the second image data comprising image data representing the object and providing information associating each of the plurality of image pixels of the second image data with a ray of said source of structured light; processing the first image data based upon the second image data to unwrap wrapped phase in the first image data; and generating the surface geometry information of said object based upon the phase unwrapped image data and position data indicating relative spatial positions of said camera and said source of structured light.

Said source of structured light may comprise a plurality of sources of structured light, each of said plurality of sources of structured light being arranged to project structured light on to at least a portion of said object different to others of said plurality of sources of structured light.

A first of the structured light may comprise light of a first colour and a second of said structured light may comprise light of a second colour. In this way, a plurality of image data may be simultaneously captured by filtering the captured image data based upon colour. For example, the first and second image data may be obtained simultaneously.

Said source of structured light may be selected from the group consisting of: a laser; a laser in combination with a fringe grating; and a projector.

The plurality of pattern elements of the structured light may correspond to a respective one of a plurality of image regions of an image generated by projecting light from the source of structured light. For example, the pattern elements may correspond to pixels of a projector or may correspond to image regions that appear as pixels in an image when the structured light is imaged.

A further aspect of the invention provides a system for generating surface geometry information of an object within an imaged region comprising: a source of structured light arranged to project first structured light comprising a periodic pattern comprising a plurality of pattern elements having a first spatial frequency onto said object; and a camera arranged to obtain first image data representing said object and said first structured light incident on said object at said plurality of offsets; and obtain second image data representing said object and said second structured light incident on said object; and a processor arranged to receive second image data, the second image data comprising image data representing the object and providing information associating each image pixel with ray of the source of structured light, process the first image data based upon the second image data to determine a relationship between each image pixel of the first image data and a pattern element of the first structured light projected from the source of structured light and generate the surface geometry information of said object based upon the determined relationship and position data indicating relative spatial positions of said camera and said source of structured light.

The system allows commodity products that are readily available at relatively low cost to be used to generate high quality three-dimensional surface information.

The camera may comprise the processor or the processor may be provided as part of a separate computing device arranged to receive image data obtained by the camera.

The imaging system may further comprise at least one reflective surface located within the imaged region, wherein each of said image data further comprises image data representing said object reflected from the at least one reflective surface.

The at least one reflective surface may be located within the imaged region to maximise a field of view of said object.

Generating the surface geometry information of said object may comprise combining the image data representing the object reflected from said at least one reflective surface and image data representing the object that is directly imaged. The combining may comprise: generating position data indicating a virtual camera location associated with each of said at least one reflective surface; and combining the image data based upon the position data indicating virtual camera locations and the position data indicating relative spatial positions of said camera and said source of structured light.

The processor may be arranged to generate said position data indicating virtual camera locations using said imaging system.

The source of structured light may comprise a plurality of sources of structured light, each of the plurality of sources of structured light being arranged to project structured light on to at least a portion of the object different to others of said plurality of sources of structured light.

The source of structured light may be arranged to project first structured light comprising light of a first colour and second structured light comprising light of a second colour.

The source of structured light may be selected from the group consisting of: a laser; a laser in combination with a fringe grating; and a projector. The projector may be for example a laser projector.

Embodiments of the invention will now be described, by way of example, with reference to the accompanying drawings in which.

Figure 1:
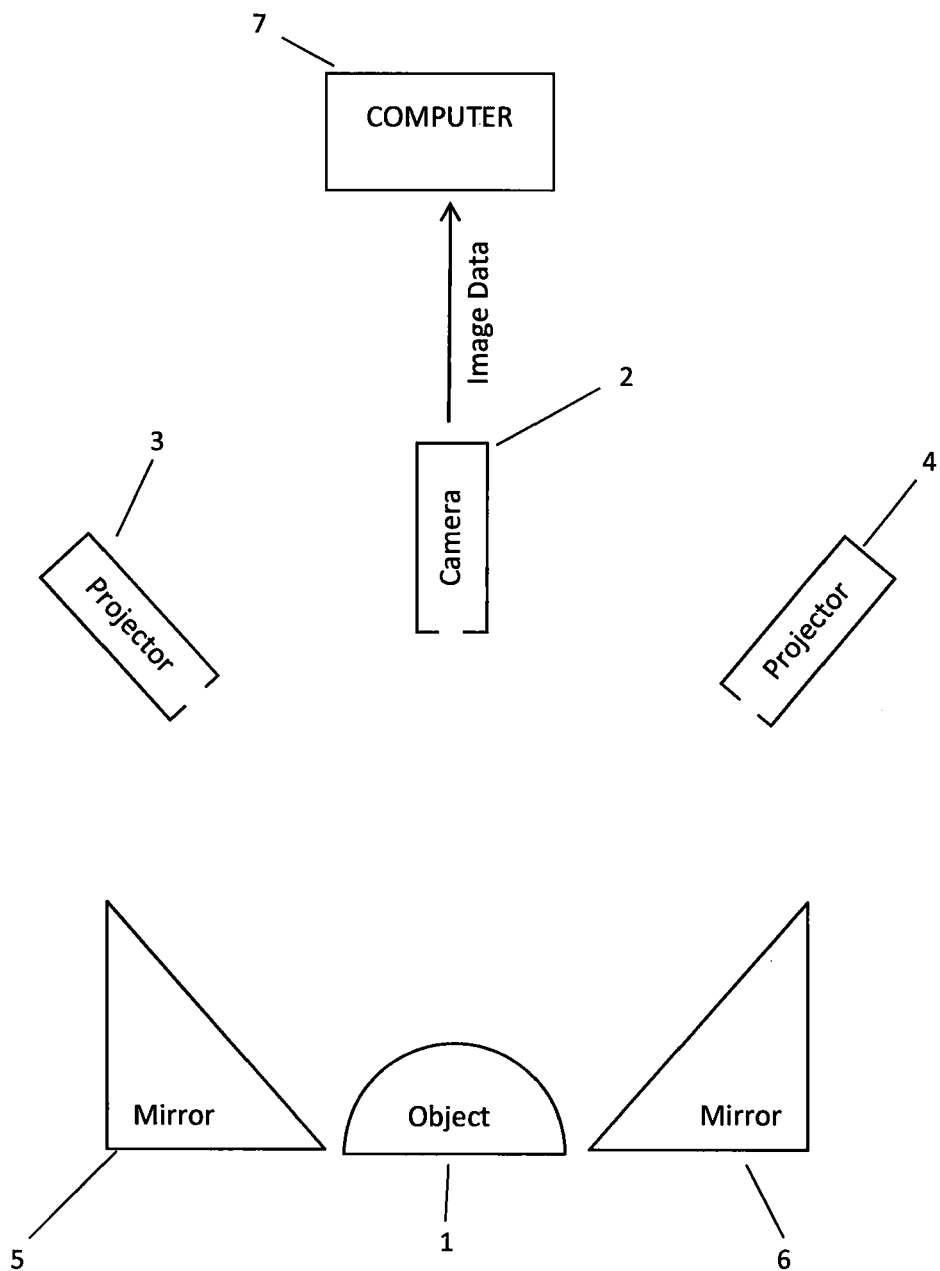
FIG. 1 is a schematic illustration of an imaging system for imaging an object according to the invention.

Referring to FIG. 1, an imaging system for imaging an object 1 in accordance with the invention is shown. The imaging system comprises a camera 2 and one or more sources of structured light 3, 4 which may for example be projectors and lasers in combination with fringe gratings. The relative positions in three-dimensional space of camera 2 and sources of structured light 3, 4 are either known or may be determined, for example using a geometric approach to position determination, typically based upon imaging of known objects such as rigid grids from different orientations and solving an optimisation problem for possible object configurations and camera parameters. Examples of suitable calibration methods are described in Geng, J. Structured-light 3D surface imaging: a tutorial, Advances in Optics and Photonics, Vol. 3, Issue 2, p. 148.

The sources of structured light 3, 4 are arranged to project structured light on to the object 1 and the camera 2 is arranged to capture image data of the object 1 together with the projected structured light incident on the object 1. For example, the sources of structured light 3, 4 may each project a sinusoidal pattern on to object 1 with the sinusoidal pattern projected by each projector having a different frequency or phase as described in detail below. One or more mirrors 5, 6 are also provided. The one or more mirrors 5, 6 provide additional camera field of view by reflecting light to the camera 2. The imaging system further comprises a computer 7 arranged to process the image data captured by the camera 2 as described in detail below.

Figure 1A:
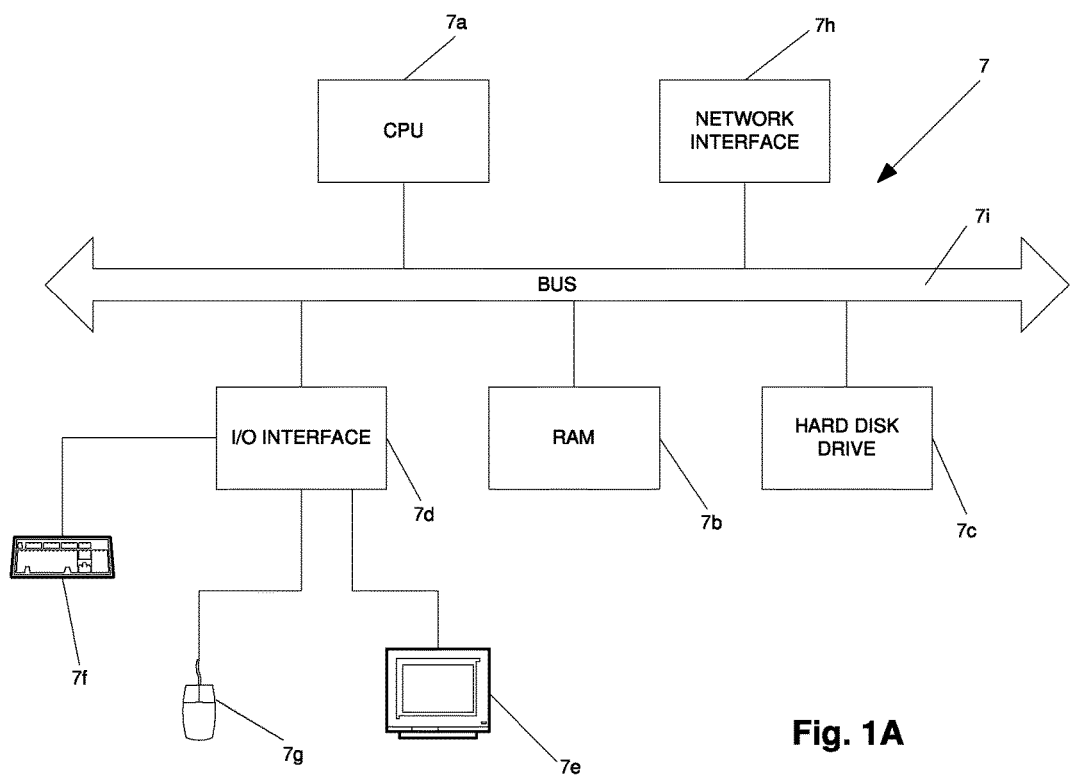
FIG. 1A is a schematic illustration of a computer of the imaging system of FIG. 1.

FIG. 1A shows the computer 7 of FIG. 1 in further detail. It can be seen that the computer comprises a CPU 7a which is configured to read and execute instructions stored in a volatile memory 7b which takes the form of a random access memory. The volatile memory 7b stores instructions for execution by the CPU 7a and data used by those instructions. For example, in use, image data generated by the camera 2 may be stored in the volatile memory 7b.

Figure 4A:
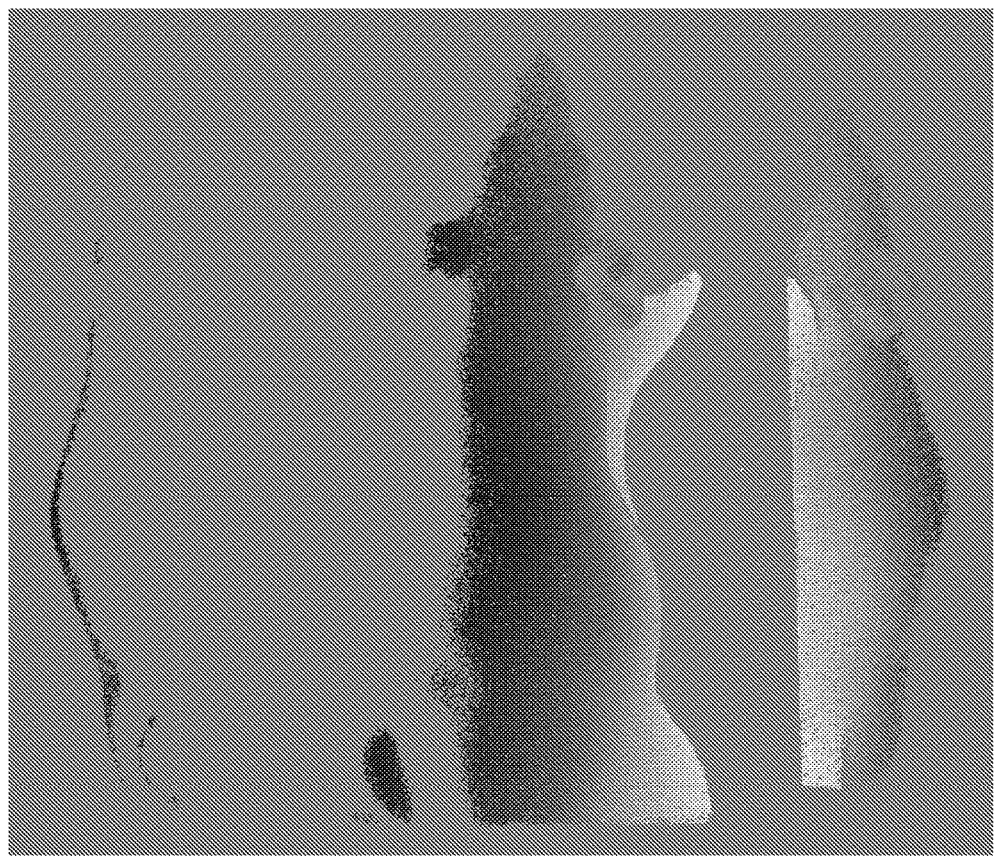
FIGS. 4A to 4C are representations of wrapped phase data at three different frequencies.
Figure 4B:
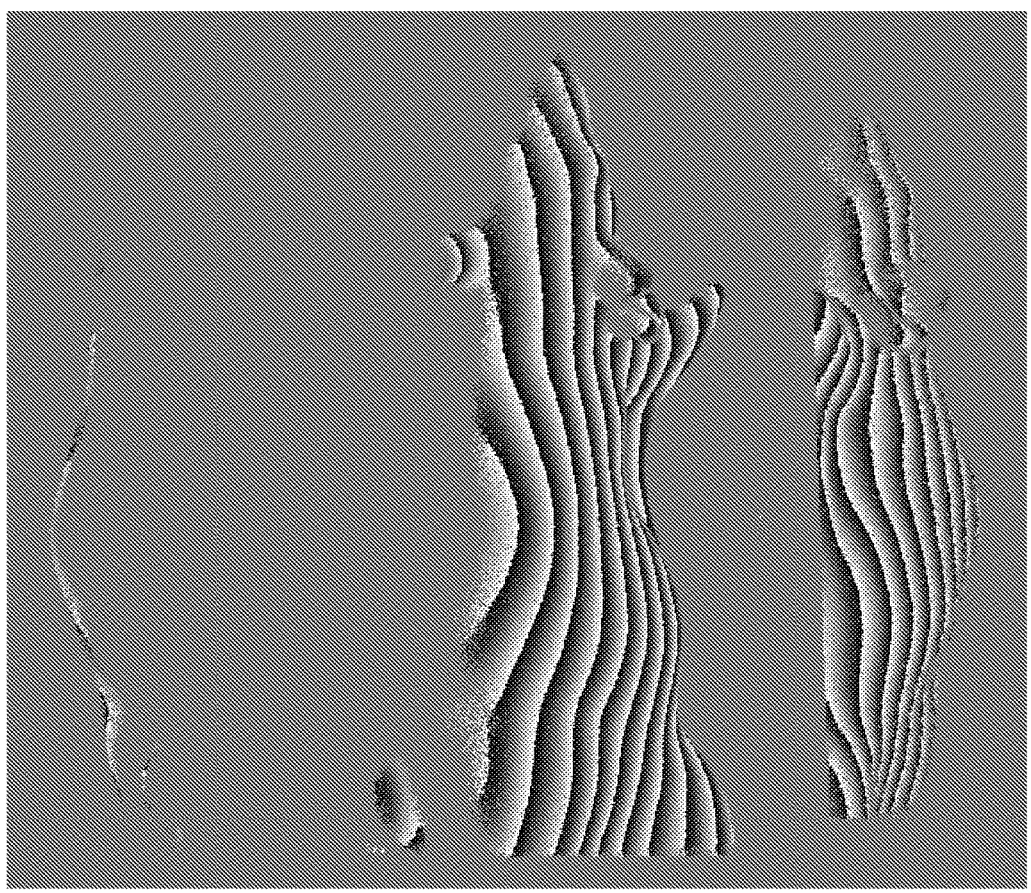
Figure 4C:
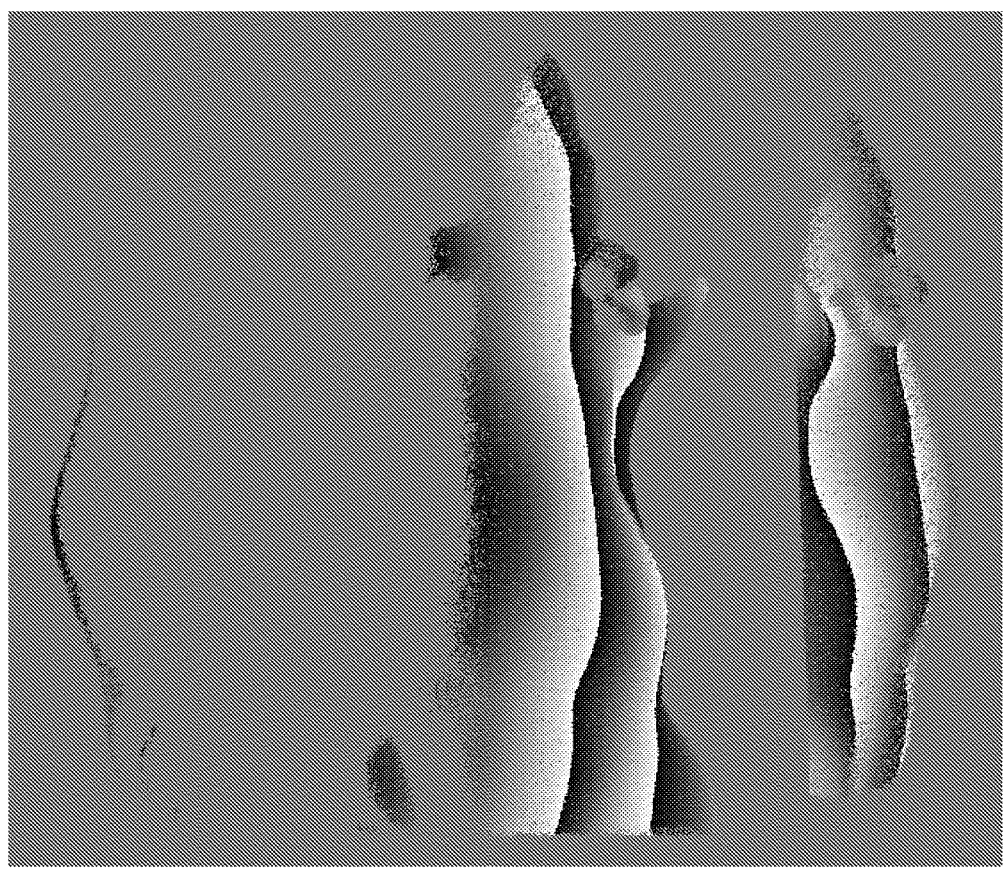

The computer 7 further comprises non-volatile storage in the form of a hard disc drive 7c. The image data generated by the camera 2 may be stored on the hard disc drive 7c. The computer 7 further comprises an I/O interface 7d to which are connected peripheral devices used in connection with the computer 7. More particularly, a display 7e is configured so as to display output from the computer 7. The display 7e may, for example, display a representation of the image data. Additionally, the display 7e may display images generated by processing of the image data, for example as shown in FIGS. 4A to 4C. Input devices are also connected to the I/O interface 7d. Such input devices include a keyboard 7f and a mouse 7g which allow user interaction with the computer 7. Alternatively or additionally display 7e may be a touch screen that may be used as an input device as well as a display device. A network interface 7h allows the computer 7 to be connected to an appropriate computer network so as to receive and transmit data from and to other computing devices. The CPU 7a, volatile memory 7b, hard disc drive 7c, I/O interface 7d, and network interface 7h, are connected together by a bus 7i.

Figure 2:
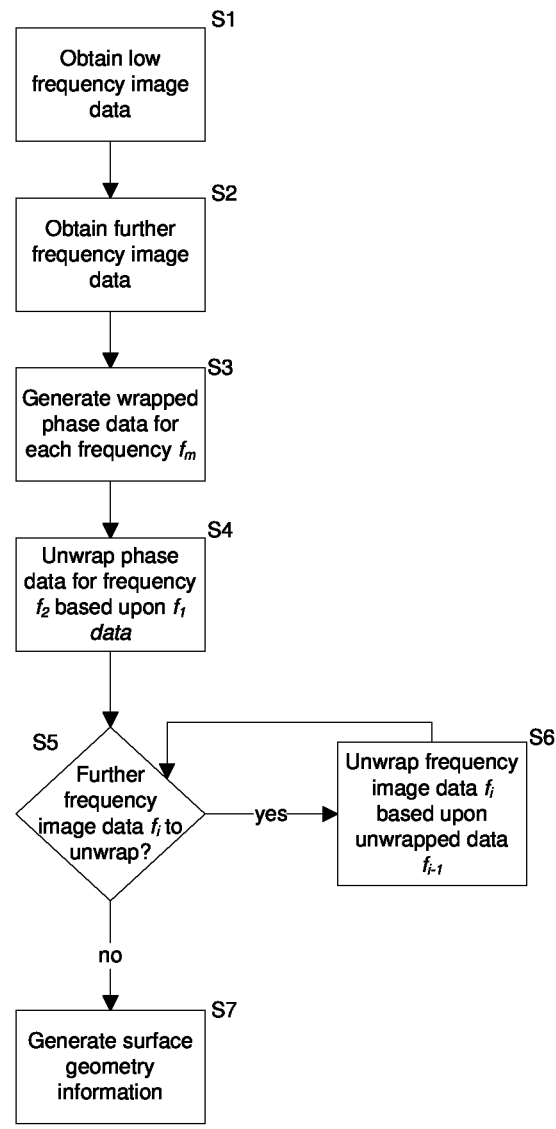
FIG. 2 is a flowchart showing processing to generate surface geometry information of an object using the imaging system of FIG. 1.

Referring to FIG. 2, processing to generate surface geometry information of an object is shown. At step S1 low frequency image data is obtained. The low frequency image data comprises image data representing the object and structured light incident on the object that is caused by the projection of a sinusoidal pattern $p_{n1}$ on to the object from at least one of sources of structured light 3, 4 at spatial frequency $f_1 \le 1/d$, where d is the size of the field of projection in the plane of interest corresponding to the area to be imaged in which the sinusoidal pattern is projected, and $N \ge 3$ phase offsets $\varphi_n$ where $\varphi_1$ is an offset of zero and $\varphi_n = (n-1) * 2*\pi/N$ in general.

A spatial frequency $f_1 \le 1/d$ can be ensured by choosing a projection frequency $f_R = 1/P$ where P is the number of pixels available to the projector in the direction of increasing phase of the sinusoidal pattern. The direction of increasing phase of the sinusoidal pattern is defined as the direction in which phase values associated with the pattern as projected, and as viewed on a flat screen placed in front of the projector and orthogonal to the projector axis, increase and in which phase values in a direction orthogonal to the direction of increasing phase are constant. In particular, as described below, the sinusoidal pattern is generated based upon the cosine of phase values such that the pattern repeats in the direction of a first axis of the pattern whilst remaining constant in the direction of a second orthogonal axis of the pattern. The phase at a pixel is therefore a linear function of a coordinate along the first axis and the direction of increasing phase of the sinusoidal pattern is the direction of the first axis.

At step S2 further frequency image data is obtained. The further frequency image data comprises image data representing the object and structured light incident on the object that is caused by the projection of a sinusoidal pattern $p_{nm}$ having frequency $f_m > f_{m-1}$, with $(f_m/f_{m-1})*e < \pi$, where e is the measurement error of the of system, and $N_m \ge 3$ phase offsets $\varphi_{nm}$.

Figure 3A:
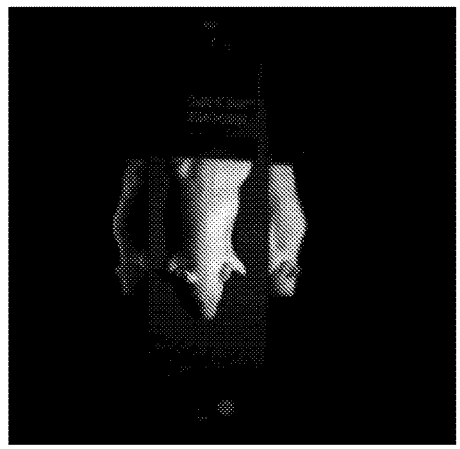
FIG. 3A is an example of an object placed in an imaging system according to the invention including two mirrors.
Figure 3B:
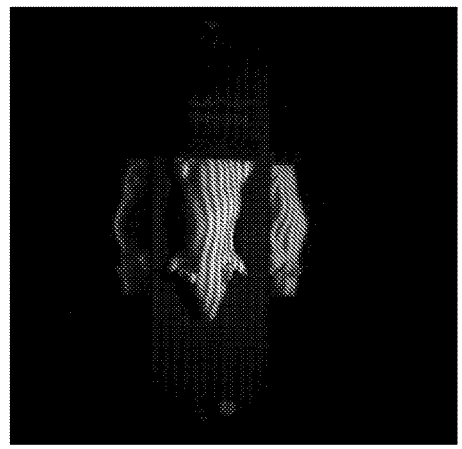
FIG. 3B is an example of the object of FIG. 3A having a sinusoidal pattern projected thereon.

For example, each of the low frequency image data and further frequency image data may comprise $N_m$ images captured by camera 2, each of the images being captured during which a sinusoidal pattern having a respective frequency and a phase n is projected on to the object. An example of an object placed in the imaging system of the present invention is shown in FIG. 3A and the same object having a relatively high frequency sinusoidal pattern projected thereon is shown in FIG. 3B. Alternatively a single image that represents the object may be generated in which structured light is projected on the object at more than one frequency simultaneously, for example by using a spectrally resolved camera and projector such that structured light projected on to the object at different frequencies simultaneously may be extracted from a single image.

Each sinusoidal spatial pattern $p_n$ at frequency f has the form shown in (1) below:

$$p_n(\underline{y}, f) = \frac{1 + \cos(2\pi f(\underline{y} - \underline{o}) \cdot (\underline{v}) + \varphi_n)}{2} \quad (1)$$

where:
o is a point on a plane orthogonal to the axis of the projector on which the spatial frequency and direction v of the projected pattern is known; and
y is a point in the plane containing o.

The imaged pattern, $g_n$ has the form (2):

$$g_n(\underline{x}, f) = b(\underline{x}) + a(\underline{x}) \frac{1 + \cos(\psi(\underline{x}, f) + \phi_n)}{2} \quad (2)$$

-continued
where:

$$\psi(\underline{x}, f) = 2\pi f(\underline{y} - \underline{o}) \cdot (\underline{v}) \quad (3)$$

At step S3 wrapped phase data $\psi(\underline{x}, f)(\text{mod } 2\pi)$, is generated for each of frequencies $f_m$. The wrapped phase data is generated based upon the image data representing the object and structured light incident on the object caused by the projection of sinusoidal pattern $p_{nm}$ at each phase n according to (4) below.

$$\psi(x, f)(\text{mod} 2\pi) = \arctan\left(\frac{\sum_{n=1}^{N} g_n(x, f)\sin\frac{2\pi n}{N}}{\sum_{N=1}^{N} g_n(x, f)\cos\left(\frac{2\pi n}{N}\right)}\right) \quad (4)$$

The wrapped phase data $\psi(\underline{x}, f)(\text{mod } 2\pi)$ generally includes $2\pi$ phase discontinuities caused by the periodic nature of the sinusoidal projected pattern. In particular, given the periodic nature of the sinusoidal projected pattern, it is not generally possible to directly determine the relationship between points of the projected repeated sinusoidal pattern and points in the imaged region given that a pixel of the projected pattern with a phase q produces exactly the same image intensity as pixels with phase $q+m*2*\pi$ given the periodic nature of the structured light. However, because the maximum phase difference for the spatial frequency $f_1$ is $2\pi$, the wrapped phase data $\psi(\underline{x}, f)$ does not contain any phase discontinuities such that the image data at frequency $f_1$ provides the phase of each point in the imaged region. In particular, given that less than or equal to one repeats of the sinusoidal wave are projected into the region that is imaged, each pixel in the low frequency image data has a phase value $-\pi \le q \le +\pi$.

Example phase maps representing the wrapped phase data are shown in FIGS. 4A, 4B and 4C for different frequencies. In particular, FIG. 4A shows a wrapped phase map generated using a sinusoidal projected pattern having a wavelength of 1024 pixels and providing 0.78 waves per projected pattern in the imaged region. FIG. 4B shows a wrapped phase map generated using a sinusoidal projected pattern having a wavelength of 11.3 pixels and providing 70.7 waves per projected pattern in the imaged region and FIG. 4C shows a wrapped phase map generated using a sinusoidal projected pattern having a wavelength of 45.3 pixels and providing 18 waves per projected pattern in the imaged region.

In each of FIGS. 4A, 4B and 4C pixel values lie in the range $(+\pi, -\pi)$, irrespective of the phase range of the projected pattern. This is due to phase values that lie outside of the range $(+\pi, -\pi)$ being phase wrapped, which causes phase to become periodic as described above. In particular, whilst phase values of the projected image between $\pi$ and $-\pi$ are unchanged by phase wrapping, phase values of $\pi+d$ for $d>2\pi$ become $-\pi+d$ in the phase wrapped image and phase values of $-\pi-d$ become $\pi-d$ in the phase wrapped image.

The effect of the phase wrapping can be seen in the wrapped phase maps as discrete changes in pixel values as the phase in the original projected pattern extends outside of the pixel range $(\pi, -\pi)$ and appears as adjacent black and white pixels in regions that are in fact continuous in the imaged object. This can be seen for example in FIG. 4B which shows stripes in the image where adjacent pixels are black, representing a pixel value of $-\pi$ and white representing a pixel value of π. Such wrapping events can also occur with isolated pixels which appear as isolated white pixels in a black region or as isolated black pixels in a white region.

As indicated above, the phase map generated at frequency $f_1$ does not include any phase wrapping events given that frequency $f_1$ is selected such that $f_1 \leq 1/d$. However it is undesirable to reconstruct surface geometry at frequency $f_1$, because phase error is relatively large at low frequencies relative to the phase values. In particular, phase is measured to an absolute error e that is approximately the same for all wrapped phase maps irrespective of pattern frequency. However the range of phases of the unwrapped phase map increases as the frequency of the projected pattern increases due to the phase increasing by a factor of 2π for each pattern repeat. The error e therefore decreases as a fraction of phase range as the pattern frequency increases such that height error associated with the phase error e also decreases.

The wrapped phase data at frequency $f_1$ can be used as prior information to unwrap the wrapped phase data for higher frequencies, which include lower errors given the increased phase range as described above. That is, the wrapped phase data at frequency $f_1$ can be used to remove phase wrapping events in higher frequency wrapped phase data. In particular the phase at a spatial point $\underline{x}$ is linearly dependent on the spatial frequency such that for frequencies $f_1=1/d$ and $f_2=2/d$, $2\psi(\underline{x},f_1)=\psi(x,f_2)$ in the absence of measurement noise and in general for $f_n=y/d$ and $f_{n+1}=z/d$, $(z/y)\psi(\underline{x},f_n)=\psi(x,f_{n+1})$. In the presence of measurement noise $\psi(x,f_2)$ can be estimated according to (5):

$$\overline{\psi}(\underline{x},f_2) = 2\psi(\underline{x},f_1) \quad (5)$$

where $\overline{\psi}(\underline{x},f_2)$ is an approximation of $\psi(\underline{x},f_2)$.

The wrapping process can then be simulated on $\overline{\psi}(\underline{x},f_2)$ to generate $\overline{\psi}(\underline{x}, f_2)$ (mod 2π) by wrapping any phase values q>+π to q=q−2*π and phase values q<−π to q=q+2*π such that for all phase values q, −π≤q≤π. The measured wrapped phase map $\psi(\underline{x}, f_2)$(mod 2π) can be compared with the simulated data to correct for measurement noise in $\overline{\psi}(\underline{x}, f_2)$.

Accordingly, at step S4 the wrapped phase data for frequency $f_2$ is unwrapped based upon the wrapped phase data for frequency $f_1$. At steps S5 and S6 remaining unwrapped phase data, if any, are iteratively unwrapped based upon the preceding phase data in a corresponding manner. The process is repeated as necessary until the phase lies within the interval (−π,π). In particular, for a frequency $f_m$ that is the lowest frequency wrapped phase data that has not been unwrapped the wrapped phase data for frequency $f_m$ is unwrapped based upon the unwrapped phase data for frequency $f_{m-1}$.

By processing image data of an object in which sinusoidal patterns at different frequencies is incident on the object in increasing frequency it is possible to produce an unwrapped high frequency phase map that contains relatively small error in a spatially independent manner. That is, the generation of an unwrapped high frequency phase of the present invention avoids the use of a spatial distribution of the wrapped phase data to determine locations of phase wrapping of prior art methods and accordingly avoids the propagation of errors in the determination of phase wrapping events through spatial regions of prior art methods.

Figure 5:
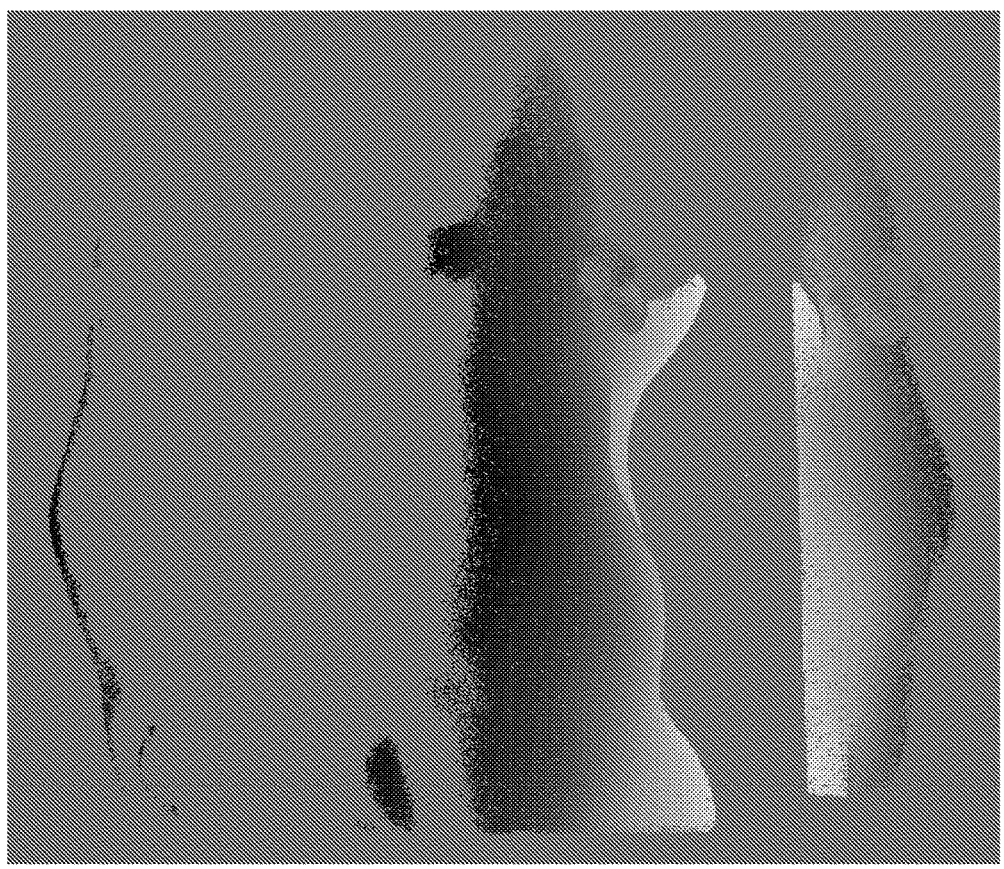
FIG. 5 is a representation of the image data of FIG. 4B after a phase unwrapping process.

A representation of the unwrapped phase data corresponding to the wrapped phase data of FIG. 4B is shown in FIG. 5. It can be seen that the unwrapped phase data of FIG. 5 does not include the stripes of the wrapped phase data of FIG. 4B indicating that a number of phase discontinuities have been resolved in the unwrapped phase data.

At step S7 the highest frequency unwrapped phase data is processed using a general geometrical model to generate surface geometry information of the object and position data indicating relative positions of the camera and the source of structured light for the frequency.

The surface geometry information may be generated using any geometrical method that is general. In a general geometric method surface geometry information is generated based upon a geometric model in which relative locations of the components of the system are modelled and the model and the unwrapped phase are used in the generation of the surface geometry information. In particular, the general geometric model models the projected pattern as a continuous field in space projected from a pupil associated with the projector and the camera as a pupil with rays emanating from the camera pupil resulting in imaged pixels.

Figure 6:
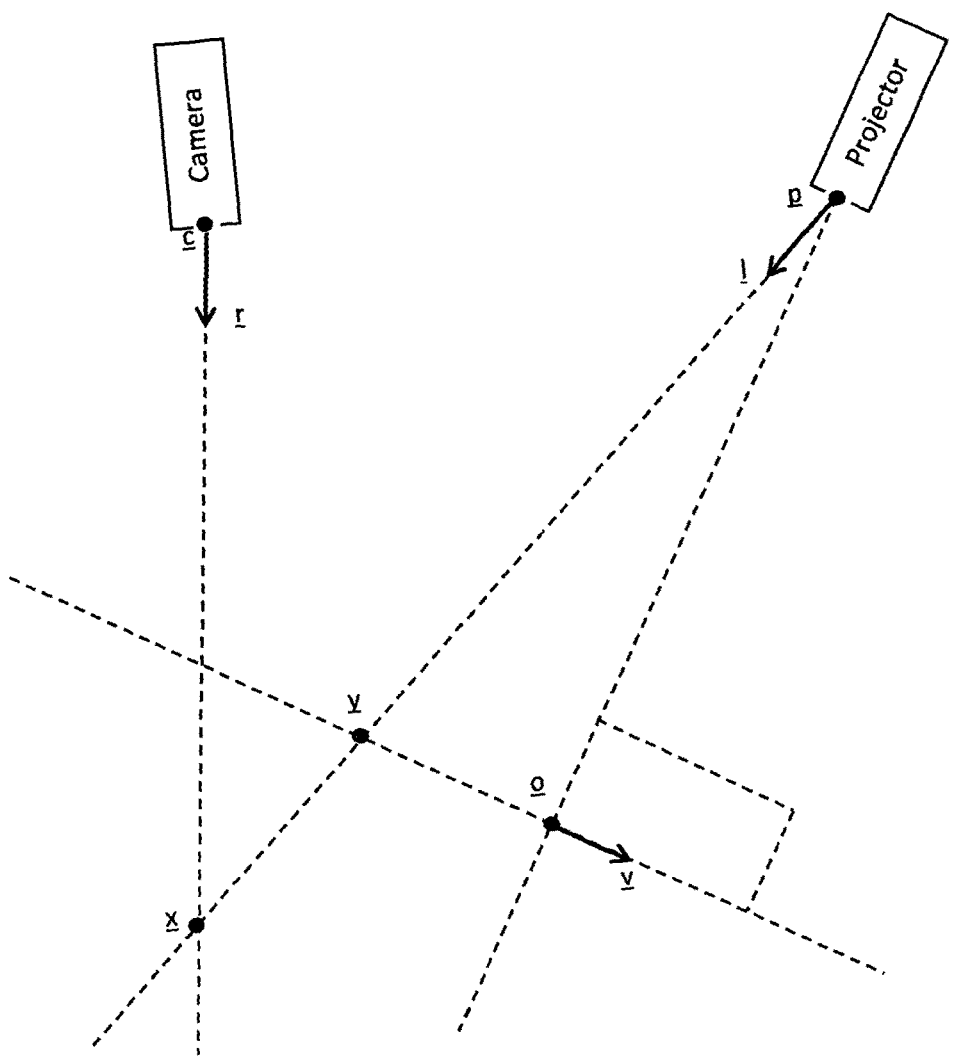
FIG. 6 is a schematic illustration of part of the system of FIG. 1.

For example, for a camera having camera pupil c and projector having pupil p, as illustrated in FIG. 6 in two dimensions, if the projector projects a sinusoidal pattern with a known spatial frequency f in a plane centred around a point o, with v the direction of greatest increasing phase, then the projected pattern can be described as in (1) with $\varphi_n=0$. The point y can be expressed as in (6):

$$\underline{y} = \underline{p} - \frac{|\underline{p}-\underline{o}|^2}{\underline{l}\cdot(\underline{p}-\underline{o})}\underline{l} \quad (6)$$

where l is a ray projected from the pupil p and can be expressed as (7) below.

$$\underline{l} = \frac{\underline{x}-\underline{p}}{|\underline{x}-\underline{p}|} \quad (7)$$

The phase ψ associated with y can be expressed as:

$$\psi = 2\pi f(y-o)\cdot \hat{v} \quad (8)$$

Using equations (6), (7) and (8) and the knowledge that point $\underline{x}$ lies on the line defined by c and r, $\underline{x}$ can be expressed as in (9):

$$\underline{x} = \underline{c} + \frac{\alpha \cdot (\underline{p}-\underline{c})}{\alpha \cdot \hat{r}} \hat{r} \quad (9)$$

where α is as in (10).

$$\alpha = \frac{\psi}{2\pi f}\frac{\underline{p}-\underline{o}}{|\underline{p}-\underline{o}|} + |\underline{p}-\underline{o}|\underline{v} \quad (10)$$

Based upon knowledge of the location of the point p, the point c and the phase ψ associated with a point the co-ordinates of $\underline{x}$ can therefore be determined from (9) and (10).

Figure 8:
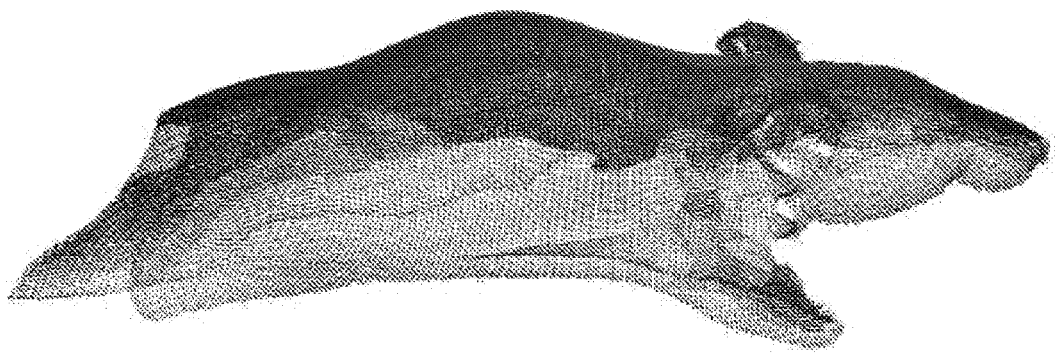
FIG. 8 is a point cloud representation of a surface geometry of the object represented in FIG. 5 generated using the processing of FIG. 3.
Figure 9:
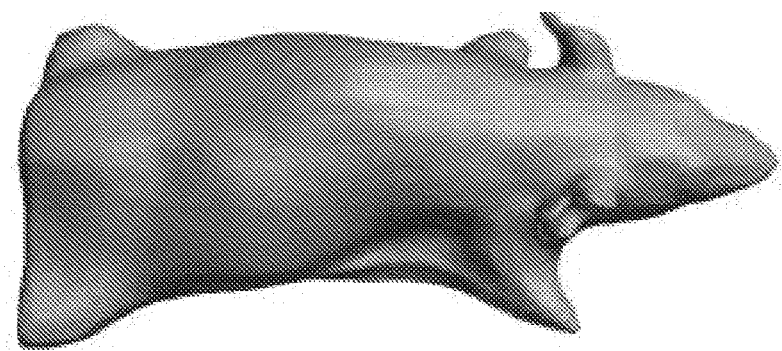
FIG. 9 is a mesh representation of the surface geometry of the object represented in FIG. 5.

The spatial coordinates may be represented as a point cloud or a mesh format to allow visualisation of the object. An example point cloud is shown in FIG. 8 and an example mesh format that has been generated using Meshlab is shown in FIG. 9.

In the above it has been described that the structured light incident on the object is caused by the projection of a sinusoidal pattern. The sinusoidal pattern may be one or two dimensional and may comprise one or more sinusoidal wave patterns. Furthermore, whilst in the above the phase of the sinusoidal pattern is illustratively linear, the phase of the sinusoidal pattern may be defined by a non-linear function. Such a non-linear phase can reduce aliasing artefacts where the structured light is projected onto the imaged region at a relatively acute angle.

Figure 7A:
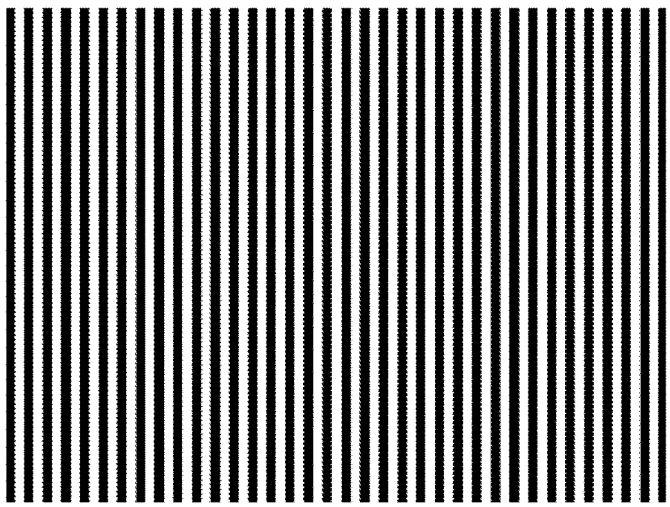
FIGS. 7A to 7C are example binary patterns suitable for encoding phase data to allow unwrapping of phase wrapped data.
Figure 7B:
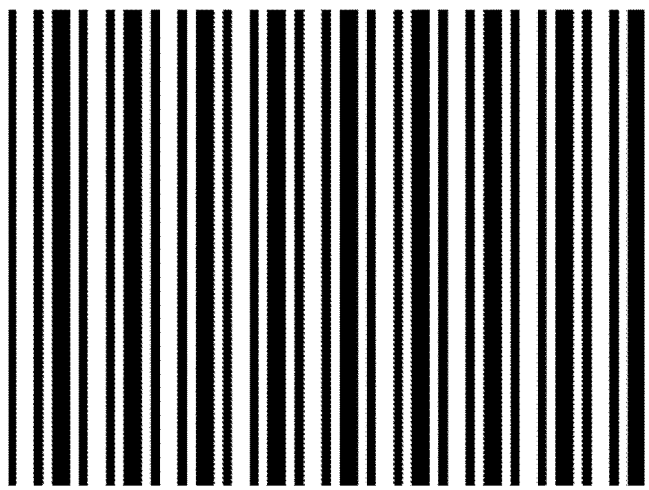
Figure 7C:
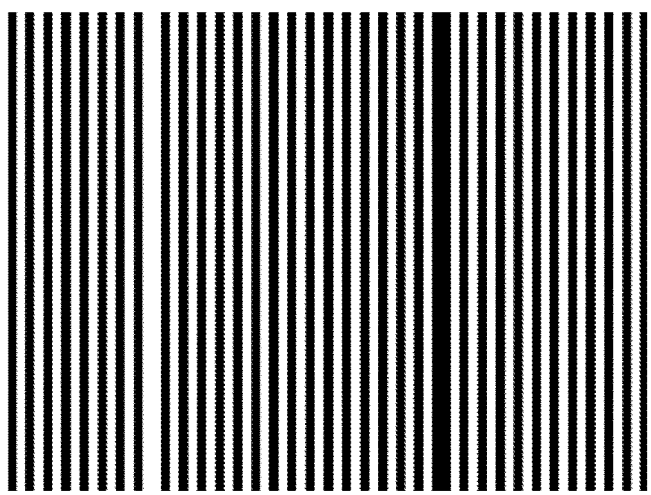

In an alternate embodiment wrapped phase data generated based upon a high frequency sinusoidal pattern having a frequency $f_m$ in the manner described above by imaging an object with the sinusoidal pattern incident upon the object at a plurality of phase offsets may be unwrapped using an encoding of the phase that is obtained based upon images of the object in which binary patterns are projected on to the object, the binary images being sufficient to provide information associating each image pixel of the imaged region with a pattern element of the pattern of the source of structured light. Examples of binary patterns are shown in FIGS. 7A-7C.

Binary images can be used to encode the phase of an image by projecting a plurality of binary patterns, that is images in which image elements of the projected pattern are either black or white, on to the object and imaging the object whilst each pattern is incident on the object. Corresponding pixel values in the obtained images may then be assigned a value of 1 or 0, for example by first imaging the object whilst continuous light is projected into the region and additionally whilst no light is projected into the region to determine pixel values corresponding to 1s and 0s, and the binary values combined to provide a binary encoding in which each pixel has an associated binary value that provides an association between the pixel and a phase value m associated with a wave of the plurality of waves of the high frequency sinusoidal pattern.

Such a binary encoding provides an efficient encoding of the phase information of the high frequency sinusoidal pattern. For example, for a high frequency sinusoidal pattern having a frequency that is such that 256 waves are present in the projected pattern, an 8 bit encoding can be used in which each image pixel in the binary encoding has an associated 8 bit value that is generated based upon 8 binary patterns projected on to the object to be imaged. The binary patterns projected onto the object to be imaged are selected in such a way that the 8 bit value of the binary encoding associated with each image pixel provides an association between each wave of the high frequency sinusoidal pattern with a pixel of the imaged region. In particular, the binary images and consequent binary encoding can be constructed to provide a value for each wave of the sinusoidal pattern.

In some embodiments camera and projector defocus can be problematic for determining a binary value for a pixel as imaged pixels may be blurred such that determining whether the pixel has a black or white region of the binary pattern incident upon the corresponding part of the imaged region cannot readily be determined. Defocus can be mitigated by using a laser projection system as the source of the patterns incident on the object, however such laser projection systems are typically expensive.

Defocus can additionally or alternatively be mitigated by using inverse Gray codings in which phases are encoded such that adjacent phases are encoded by values that differ by all but one value in the encoding and generating two encodings offset from one another by half the length of the sinusoid wave in the high frequency pattern. For example in an 8 bit encoding, for phases m encoded by a binary value 00001001 a phase m+1 may be encoded by a binary value 11110111. In particular, the binary encoding for m differs from the encoding for phase m+1 at all bits other than one (the right most bit). By imaging the object whilst each of the binary patterns is incident upon the object at an offset of zero and additionally at an offset of half the length of a sinusoid in the high frequency pattern, information is provided that can allow errors caused by defocus to be corrected. In particular, using an offset of half the length of the sinusoid wave in the high frequency pattern causes pixels that fall at the edge of a pattern strip in one pattern to fall at the centre of the same pattern strip in the offset pattern and the inverse Gray coding provides a maximal number of measurements that can be used to resolve values that are known to fall within one of two adjacent waves based upon the offset binary patterns given that information is provided by values that differ between the offset encodings.

As shown in FIG. 1, mirrors 5, 6 may be provided in the imaging system to provide additional field of view to the camera during image data capture. The virtual location of the virtual camera that is used in the generation of the surface geometry information is the reflection of the real camera about the plane of the mirror and can be determined based upon the known location of the mirror and the known location of the real camera. Phase data generated from light reflected in mirrors 5, 6 is then processed as if it is captured by the virtual camera in the same way as the image data that is not reflected (i.e. that is imaged directly by the camera) and can be combined with the image data that is not reflected. In particular, the virtual camera locations are modelled in the general geometric model described above by modelling the virtual camera location at a point corresponding to reflection of the real camera in the plane associated with the mirrors. Each of the image data generated based upon the real camera location and the virtual camera location have a common coordinate system such that the image data can be combined in a straightforward way by combining three-dimensional co-ordinate values generated from the image data both from reflected and directly imaged views into a single data set.

The present invention allows the use of mirrors by removing the requirement of prior art systems that a cross-axis instrument geometry is used. In particular, the processing of phase data of the present invention allows arbitrary instrument geometries to be used which allows considerably more flexibility in the instrument arrangement but additionally allows the use of mirrors in which the mirrors are placed so as to effectively increase the camera field of view without the requiring that the virtual camera positions required by the use of mirrors satisfy the cross-axis instrument geometry. Furthermore, the use of mirrors increases the likelihood of imaging regions in the captured image data with discontinuities and prior art phase unwrapping techniques are generally less able to process image data with such discontinuities.

Although specific embodiments of the invention have been described above, it will be appreciated that various modifications can be made to the described embodiments without departing from the spirit and scope of the present invention. That is, the described embodiments are to be considered in all respects exemplary and non-limiting. In particular, where a particular form has been described for particular processing, it will be appreciated that such processing may be carried out in any suitable form arranged to provide suitable output data.

The invention claimed is:

1. A method of generating surface geometry information of an object within an imaged region using an imaging system comprising a camera and a source of structured light comprising a source of a plurality of rays of light, the method comprising:

obtaining first image data comprising a plurality of pixels, the first image data comprising phase wrapped image data representing the object and first structured light incident on the object, the first structured light comprising a periodic pattern comprising a plurality of sinusoidal pattern elements and having a first spatial frequency projected from said source of structured light;

obtaining second image data comprising a plurality of pixels, the second image data comprising image data representing the object and providing information associating each of the plurality of image pixels of the second image data with a ray of said source of structured light;

processing the first image data based upon the second image data to determine a relationship between each of the plurality of image pixels of the first image data and a pattern element of said pattern of the first structured light projected from said source of structured light, wherein said processing comprises unwrapping the phase of the first image data based upon the second image data; and generating the surface geometry information of said object based upon the determined relationship and position data indicating relative spatial positions of said camera and said source of structured light, wherein the second image data is generated based upon third image data comprising image data representing the object and second structured light incident on the object, wherein the second structured light comprises at least one of:

a periodic pattern comprising a second plurality of sinusoidal pattern elements having a second spatial frequency projected from said source of structured light, wherein the first spatial frequency is greater than the second spatial frequency, and at least one binary pattern, wherein the second image data comprises a binary encoding associating each of the plurality of image pixels of the second image data with a ray of said source of structured light.

2. A method according to claim 1, wherein said imaging system further comprises at least one reflective surface located within the imaged region to maximize a field of view of said object, wherein each of said image data further comprises image data representing the object reflected from said at least one reflective surface.

3. A method according to claim 2, wherein generating the surface geometry information of said object comprises combining the image data representing the object reflected from said at least one reflective surface and image data representing the object that is directly imaged.

4. A method according to claim 3, wherein said combining comprises:

generating position data indicating a virtual camera location associated with each of said at least one reflective surface; and combining the image data based upon the position data indicating virtual camera locations and the position data indicating relative spatial positions of said camera and said source of structured light, and further comprising generating said position data indicating virtual camera locations using said imaging system.

5. A method according to claim 1, wherein generating the surface geometry information of said object based upon the determined relationship and position data indicating relative spatial positions of said camera and said source of structured light comprises:

processing the determined relationship based upon a geometric model in which relative spatial positions of said camera and said source of structured light are modelled.

6. A method according to claim 1, wherein the first spatial frequency is smaller than the second spatial frequency and wherein said second image data is generated based upon said third image data and further image data comprising image data representing the object and further structured light incident on the object, the further structured light comprising a periodic pattern having a further spatial frequency projected from said source of structured light, wherein the second spatial frequency is smaller than the further spatial frequency.

7. A method according to claim 6, wherein one of the second spatial frequency and the further spatial frequency has a spatial frequency less than or equal to one within the imaged region.

8. A method according to claim 6, wherein said processing the first image data based upon the second image data to determine a relationship between each image pixel of the first image data and the first structured light projected from said source of structured light is based upon said first spatial frequency and a spatial frequency associated with said second image data.

9. A method according to claim 1, wherein the second image data comprises phase unwrapped image data and wherein unwrapping the phase of the first image data is based upon the phase unwrapped image data.

10. A method according to claim 1, wherein at least one of said first and said second image data is generated based upon a plurality of images of said object and structured light incident upon said object, wherein said pattern has a respective offset in each of said plurality of images and wherein a plurality of offsets associated with said first image data is greater than a plurality of offsets associated with said second image data.

11. A method according to claim 1, wherein said source of structured light comprises a plurality of sources of structured light, each of said plurality of sources of structured light being arranged to project structured light on to at least a portion of the object different to others of said plurality of sources of structured light.

12. A method according to claim 1, wherein a first of said structured light comprises light of a first color and a second of said structured light comprises light of a second color.

13. A method according to claim 1, wherein said source of structured light is selected from the group consisting of: a laser; a light source in combination with a fringe grating; and a projector.

14. A computer apparatus for generating surface geometry information of an object within an imaged region using an imaging system comprising a camera and a source of structured light comprising:

a memory storing processor readable instructions; and a processor arranged to read and execute instructions stored in said memory;

wherein said processor readable instructions comprise instructions arranged to control the computer to carry out a method according to claim 1.

15. A non-transitory computer readable medium carrying a computer program comprising computer readable instructions configured to cause a computer to carry out a method comprising:

obtaining first image data comprising a plurality of pixels, the first image data comprising phase wrapped image data representing the object and first structured light incident on the object, the first structured light comprising a periodic pattern comprising a plurality of sinusoidal pattern elements and having a first spatial frequency projected from said source of structured light;

obtaining second image data comprising a plurality of pixels, the second image data comprising image data representing the object and providing information associating each of the plurality of image pixels of the second image data with a ray of said source of structured light;

processing the first image data based upon the second image data to determine a relationship between each of the plurality of image pixels of the first image data and a pattern element of said pattern of the first structured light projected from said source of structured light, wherein said processing comprises unwrapping the phase of the first image data based upon the second image data; and generating the surface geometry information of said object based upon the determined relationship and position data indicating relative spatial positions of said camera and said source of structured light, wherein the second image data is generated based upon third image data comprising image data representing the object and second structured light incident on the object, wherein the second structured light comprises at least one of:
 a periodic pattern comprising a second plurality of sinusoidal pattern elements having a second spatial frequency projected from the said source of structured light, wherein the first spatial frequency is greater than the second spatial frequency, and
 at least one binary pattern, wherein the second image data comprises a binary encoding associating each of the plurality of image pixels of the second image data with a ray of said source of structured light.

16. A system for generating surface geometry information of an object within an imaged region comprising:
 a source of structured light arranged to project first structured light comprising a periodic pattern comprising a plurality of sinusoidal pattern elements having a first spatial frequency onto said object;
 a camera arranged to:
  obtain first phase wrapped image data representing said object and said first structured light incident on said object; and
 a processor arranged to:
  receive second image data, the second image data comprising image data representing the object and providing information associating each image pixel with a ray of the source of structured light;
  process the first image data based upon the second image data to determine a relationship between each image pixel of the first image data and a pattern element of the first structured light projected from the source of structured light, wherein said processing comprises unwrapping the phase of the first image data based upon the second image data; and
  generate the surface geometry information of said object based upon the determined relationship and position data indicating relative spatial positions of said camera and said source of structured light,
  wherein the second image data is generated based upon third image data comprising image data representing the object and second structured light incident on the object, wherein the second structured light comprises at least one of:
   a periodic pattern comprising a second plurality of sinusoidal pattern elements having a second spatial frequency projected from said source of structured light, wherein the first spatial frequency is greater than the second spatial frequency, and
   at least one binary pattern, wherein the second image data comprises a binary encoding associating each of the plurality of image pixels of the second image data with a ray of said source of structured light.

17. A system according to claim 16, wherein the camera comprises the processor.

18. A system according to claim 16, wherein the system further comprises at least one reflective surface located within the imaged region to maximize a field of view of said object, wherein each of said image data further comprises image data representing the object reflected from said at least one reflective surface.

19. A system according claim 16, wherein the source of structured light comprises a plurality of sources of structured light, each of the plurality of sources of structured light being arranged to project structured light on to at least a portion of the object different to others of said plurality of sources of structured light.

* * * * *